(12) United States Patent
Yang et al.

(10) Patent No.: US 10,397,795 B2
(45) Date of Patent: Aug. 27, 2019

(54) FRAME STRUCTURE AND DATA MAPPING FOR LICENSE ASSISTED ACCESS

(71) Applicant: MEDIATEK INC., Hsinchu (TW)

(72) Inventors: Weidong Yang, San Diego, CA (US);
Pei-Kai Liao, Nantou County (TW);
Chien-Chang Li, Penghu County (TW); Bo-Si Chen, Keelung (TW)

(73) Assignee: MEDIATEK INC., HsinChu (TW)

( * ) Notice: Subject to any disclaimer, the term of this patent is extended or adjusted under 35 U.S.C. 154(b) by 0 days.

(21) Appl. No.: 15/010,000

(22) Filed: Jan. 29, 2016

(65) Prior Publication Data

US 2016/0227545 A1 Aug. 4, 2016

Related U.S. Application Data

(60) Provisional application No. 62/109,823, filed on Jan. 30, 2015.

(51) Int. Cl.
*H04W 4/00* (2018.01)
*H04W 16/14* (2009.01)
(Continued)

(52) U.S. Cl.
CPC ........... *H04W 16/14* (2013.01); *H04L 5/0092* (2013.01); *H04W 72/0406* (2013.01);
(Continued)

(58) Field of Classification Search
CPC combination set(s) only.
See application file for complete search history.

(56) References Cited

U.S. PATENT DOCUMENTS

2014/0044105 A1\* 2/2014 Bontu .................... H04L 5/001
370/336
2014/0112289 A1\* 4/2014 Kim ..................... H04W 16/14
370/329
(Continued)

FOREIGN PATENT DOCUMENTS

CN 101232359 A 7/2008
CN 101753507 A 6/2010
(Continued)

OTHER PUBLICATIONS

R1-151059, LAA frame structure design, 3GPP TSG RAN WG1 LAA Ad Hoc Meeting, 8 pages, Mar. 2015.\*
(Continued)

*Primary Examiner* — Frank Duong
(74) *Attorney, Agent, or Firm* — Imperium Patent Works; Mark Marrello; Helen Mao

(57) ABSTRACT

Methods and apparatus are provided for improved Licensed Assisted Access (LAA) networks. A LAA subframe is received via an unlicensed frequency band. Control information is communicated via predetermined symbol locations within the LAA subframe. An indication of a first and a second symbol locations is received. A LAA subframe is then received. It is determined if control information is present at the first or second symbol locations within the received LAA subframe. Demodulation parameters based on the control information are determined. The LAA subframe is demodulated using the demodulation parameters. An indication of a transmission duration is communicated to a UE. The transmission duration is determined based on the LAA subframe. A type of subframe is determined based on transmission duration. Automatic Gain Control (AGC) protection is provided in a LAA subframe. The AGC protection (Continued)

LLA subframe does not communicate control information in a symbol adjacent to a reservation signal.

20 Claims, 7 Drawing Sheets

(51) Int. Cl.
    *H04W 72/04*     (2009.01)
    *H04L 5/00*     (2006.01)
    *H04L 5/14*     (2006.01)

(52) U.S. Cl.
    CPC .......... *H04L 5/0007* (2013.01); *H04L 5/0048* (2013.01); *H04L 5/14* (2013.01)

(56) References Cited

U.S. PATENT DOCUMENTS

| | | | |
|---|---|---|---|
| 2015/0249974 A1 | 9/2015 | Lee et al. | 370/329 |
| 2016/0127098 A1* | 5/2016 | Ng | H04L 5/0048 |
| | | | 370/329 |
| 2016/0135143 A1* | 5/2016 | Won | H04W 72/005 |
| | | | 370/312 |
| 2016/0135181 A1* | 5/2016 | Nogami | H04W 24/08 |
| | | | 370/329 |
| 2016/0227578 A1* | 8/2016 | Lee | H04W 74/004 |
| 2016/0309464 A1* | 10/2016 | Mukherjee | H04W 28/06 |
| 2017/0127414 A1 | 5/2017 | Yi et al. | 370/329 |
| 2017/0311320 A1* | 10/2017 | Lunttila | H04L 5/001 |

FOREIGN PATENT DOCUMENTS

| | | |
|---|---|---|
| CN | 102316522 A | 1/2012 |
| WO | WO2014062011 A1 | 10/2012 |
| WO | WO2014051606 A1 | 4/2014 |
| WO | WO2015190883 A1 | 6/2014 |

OTHER PUBLICATIONS

International Search Report and Written Opinion of International Search Authority for PCT/CN2016/073025 dated May 6, 2016 (12 pages).
3GPP TSG RAN1 #80bis R1-151626, Samsung, Discussion on (E)PDCCH/PDSCH transmission in partial subframe for LAA, Belgrade, Serbia dated Apr. 20-24, 2015 (4 pages).
3GPP TSG RAN WG1 Meeting #80-BIS R1-151826, Intel Corp., Frame structure and (e)PDCCH for LAA downlink, Belgrade, Serbia, dated Apr. 20-24, 2015 (7 pages).
EPO, search report for the EP patent application 16742815.0 dated Aug. 13, 2018 (16 pages).
R1-153274 3GPP TSG RAN WG1 Meeting #80bis, ITL, "On data transmission with partial TTI for LAA", Fukuoka, Japan, May 25-29, 2015 (4 pages).

\* cited by examiner

LAA FRAME STRUCTURE WITH TIME SHIFTING

LAA FRAME STRUCTURE WITH AGC PROTECTION

TRUNCATED LAA FRAME STRUCTURE WITH AGC PROTECTION

FRAME STRUCTURE AND DATA MAPPING FOR LICENSE ASSISTED ACCESS

CROSS REFERENCE TO RELATED APPLICATIONS

This application claims priority under 35 U.S.C. § 119 from U.S. Provisional Application No. 62/109,823 entitled, "LAA DESIGN CONSIDERING ENB LBT BEHAVIOR" filed on Jan. 30, 2015; the subject matter of which is incorporated herein by reference.

TECHNICAL FIELD

The disclosed embodiments relate generally to wireless communication, and, more particularly, to frame structure design and data mapping methods in Licensed-Assisted-Access (LAA).

BACKGROUND

Third generation partnership project (3GPP) and Long Term Evolution (LTE) mobile telecommunication systems provide high data rate, lower latency and improved system performances. With the rapid development of "Internet of Things" (IOT) and other new user equipment (UE), the demand for supporting machine communications increases exponentially. To meet the demand of this exponential increase in communications, additional spectrum (i.e. radio frequency spectrum) is needed. The amount of licensed spectrum is limited. Therefore, communications providers need to look to unlicensed spectrum to meet the exponential increase in communication demand.

One suggested solution is to use a combination of licensed spectrum and unlicensed spectrum. This solution is referred to as "Licensed Assisted Access" or "LAA". In such a solution, an established communication protocol such as Long Term Evolution(LTE)can be used over the licensed spectrum to provide a first communication link, and LTE can also be used over the unlicensed spectrum to provide a second communication link.

While this suggested solution is straightforward in theory, practical usage of such a solution while complying with various government regulations regarding the usage of unlicensed spectrum is not so straightforward. Moreover, maintaining reliable communication over a secondary unlicensed link requires improved techniques.

Improvements and enhancements are needed to deploy a compliant and reliable LAA network.

SUMMARY

Methods and apparatus are provided for improved Licensed Assisted Access networks.

In one novel aspect, control information is communicated via predetermined symbol locations within a LAA subframe.

In one embodiment, an indication of a first symbol location and an indication of a second symbol location are received onto a User Equipment (UE). A License Assisted Access (LAA) subframe is then received onto the UE. The LAA subframe includes multiple symbols. Then it is determined if control information is present at the first symbol location within the received LAA subframe. A second determination is made if control information is present at the second symbol location within the received LAA subframe if it was determined that control information was not present at the first symbol location. Demodulation parameters based on the control information that is present in either the first symbol location or the second symbol location are determined. Lastly, LAA subframe is demodulated using the demodulation parameters.

In a second embodiment, the control information includes at least one of: a Cell-specific Reference Signal (CRS), a Physical Downlink Control Channel (PDCCH), a Physical Control Format Indicator Channel (PCFICH), or a Physical Broadcast Channel (PBCH).

In a second novel aspect, an indication of a transmission duration is communicated to a UE.

In one embodiment, a License Assisted Access (LAA) subframe is received onto a User Equipment (UE). The LAA subframe includes multiple symbols. A transmission duration is determined based on the received subframe. Lastly, a type of subframe is determined. The determining is a function of the received LAA subframe and the transmission duration. The LAA subframe was received via an unlicensed frequency band, and the determination are performed by the UE.

In a second embodiment, the UE receives the LAA subframe from a first base station via an unlicensed frequency band, and the UE is also in communication with a second base station via a licensed frequency band.

In a third novel aspect, Automatic Gain Control (AGC) protection is provided in a LAA subframe.

In one embodiment, a License Assisted Access (LAA) subframe is generated. The control information is included in the LAA subframe. A first symbol location where the control information is present is not adjacent to a second symbol location where the reservation signal is present. The LAA subframe is then transmitted via an unlicensed frequency band.

In a second embodiment, the LAA subframe is transmitted using Long-Term Evolution (LTE) wireless communication.

Further details and embodiments and methods are described in the detailed description below. This summary does not purport to define the invention. The invention is defined by the claims.

BRIEF DESCRIPTION OF THE DRAWINGS

The accompanying drawings, where like numerals indicate like components, illustrate embodiments of the invention.

DETAILED DESCRIPTION

Reference will now be made in detail to some embodiments of the invention, examples of which are illustrated in the accompanying drawings.

Figure 1:
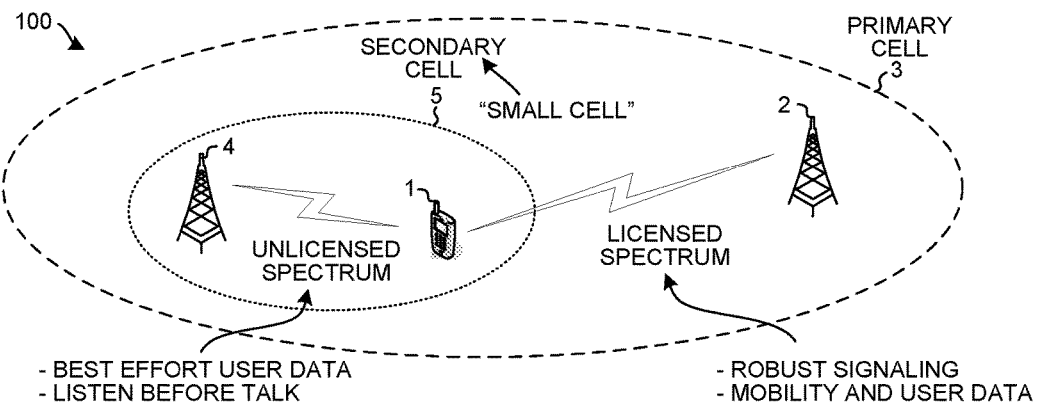
FIG. 1 illustrates an exemplary Licensed Assisted Access (LAA) wireless network in accordance with embodiments of the current invention.

FIG. 1 illustrates an exemplary Licensed Assisted Access (LAA) wireless network 100 with improved methods in accordance with embodiments of the current invention. Wireless communications system 100 includes one or more wireless networks, and each of the wireless communication networks has fixed base infrastructure units, such as 2 and 4. The base infrastructure units may also be referred to as an access point, an access terminal, a base station, eNB, or by other terminology used in the art. Each of the base stations 2 and 4 serve a geographic area. The geographic area served by wireless communications stations 2 and 4 overlaps in this example.

Base station 2 is a licensed base station that communicates with UE 1 via a licensed frequency band. In one example, base station 2 communicates with UE 1 via Long-Term Evolution (LTE) wireless communication. Base station 2 provides wireless communication to multiple UEs within primary cell 3.

Base station 4 is an unlicensed base station that communicates with UE 1 via an unlicensed frequency band. In one example, base station 4 communicates with UE 1 via LTE wireless communication. Base station 4 can communicate with multiple UEs with secondary cell 5. Secondary cell 5 is also referred to as a "small cell".

The exponential growth in data consumption has created large bandwidth demands that cannot be met by current wireless systems. To meet this ever-increasing demand for data, new wireless systems with greater available bandwidth are needed. Licensed Assisted Access (LAA) wireless networks can be used to provide greater available bandwidth. A LAA network utilizes licensed frequency bands in addition to unlicensed frequency bands contemporaneously, thereby provided additional available bandwidth to the UEs in the wireless system. While utilization of the unlicensed spectrum provides more available bandwidth, the use of the unlicensed spectrum does not come without practical problems that need to be addressed.

A first problem is that many countries require operators in unlicensed frequency bands to adhere to the Listen-Before-Talk (LBT) protocol. The LBT protocol requires that diverse users of shared spectrum do not transmit signals over one another, and that all users have an equal and fair chance of accessing the unlicensed spectrum. Under these regulations, a base station may reserve an unlicensed channel in the middle of a subframe by transmitting a reservation signal. This can cause an Automatic Gain Control (AGC) problem for the UE. The UE AGC circuit, within the receiver of the UE, may not achieve a necessary gain setting by the time the UE receives begins to receive the first symbol following the reservation signal. This problem is exacerbated be the fact that important reference signals are the symbols that follow the reservation signal.

Another problem is that a system and method is needed to efficiently use available fractional subframes that are often available in the unlicensed frequency bands. Multiple solutions to these are provided in the present application.

Referring back to FIG. 1, once the various problems listed above are addressed, UE 1 can benefit from simultaneous use of the licensed frequency band and the unlicensed frequency band in a LAA network. The LAA network not only provides additional bandwidth for greater overall data communication, but also provide more consistent data connectivity due to the presence of two separate data links. Having multiple data links available increases the probability that the UE will be able to achieve proper data communication with at least one base station at any given moment.

Figure 2:
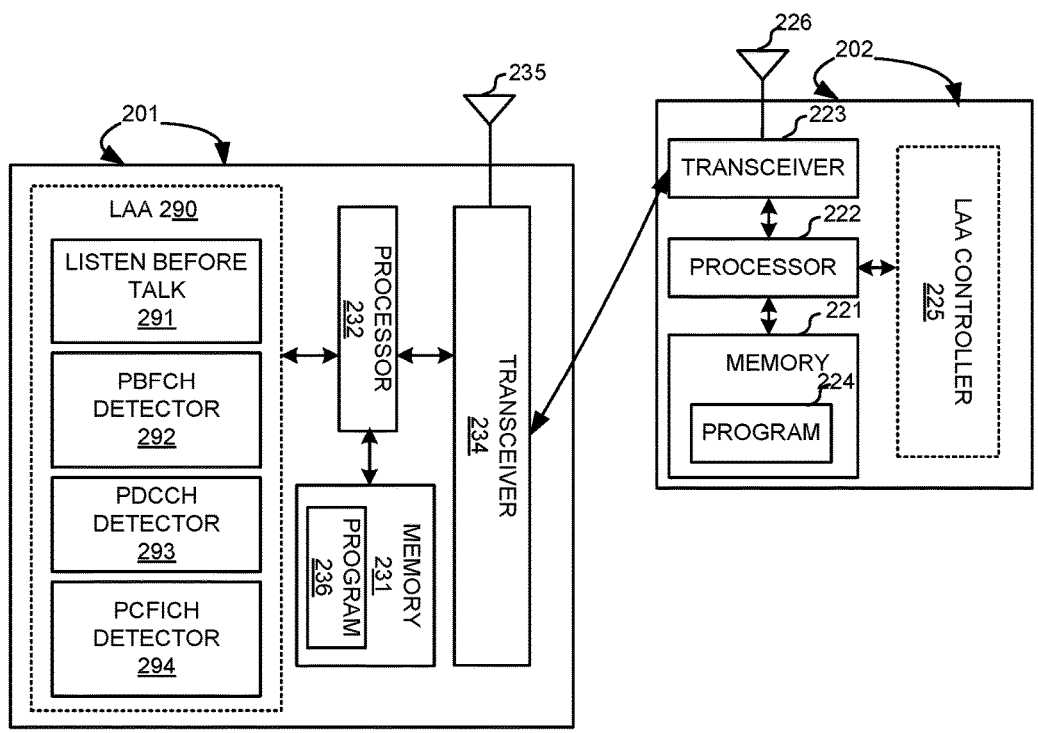
FIG. 2 illustrates an exemplary block diagram of a User Equipment (UE) and a base station (eNB) in accordance with embodiments of the current invention.

FIG. 2 illustrates the various components included in a UE 201 and a base station 202. Base station 202 may have an antenna array 226 comprising one or more antennas, which transmit and receive radio signals. A RF transceiver module 223, coupled with the antenna, receives RF signals from antenna array 226, converts them to baseband signals and sends them to processor 222. RF transceiver 223 also converts received baseband signals from processor 222, converts them to RF signals, and sends out to antenna array 226. Processor 222 processes the received baseband signals and invokes different functional modules to perform features in base station 202. Memory 221 stores program instructions and data 224 to control the operations of base station 202. Base station 202 also includes a set of control modules, LAA controller 225 that carries out functional tasks to configure, schedule, execute and communicate with the UE 201 for LAA tasks such as described in detail below.

UE 201 has an antenna array 235 with a single antenna, which transmits and receives radio signals. A RF transceiver module 234, coupled with the antenna, receives RF signals from antenna array 235, converts them to baseband signals and sends them to processor 232. RF transceiver 234 also converts received baseband signals from processor 232, converts them to RF signals, and sends out to antenna 235. Processor 232 processes the received baseband signals and invokes different functional modules to perform features in mobile station 201. Memory 231 stores program instructions and data 6 to control the operations of UE 201.

UE 201 also includes a set of control modules that carry out functional tasks. Listen Before Talk handler 291 ensure that the UE 201 does not transmit signals when another unlicensed frequency band user is transmitting. PBCH detector 292 detects Physical Broadcast Channel (PBCH) information, PDCCH detector 293 detects Physical Downlink Control Channel (PDCCH) information, and PCFICH detector 294 detects Physical Control Format Indicator Channel information.

Figure 3:
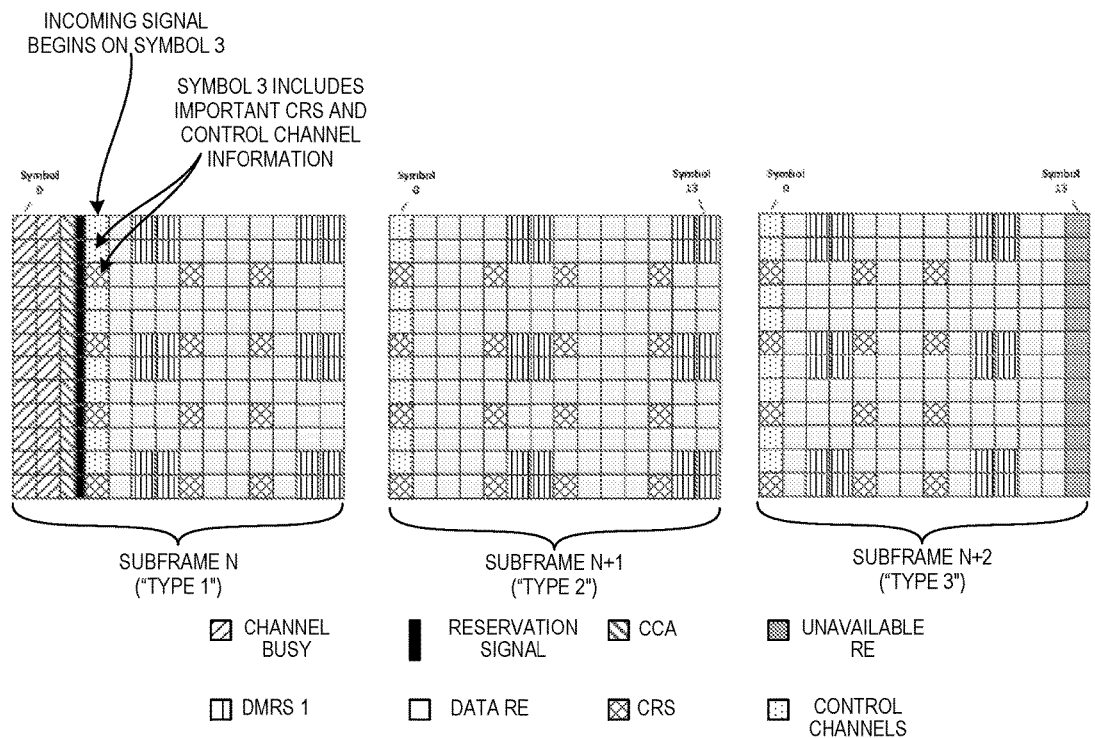
FIG. 3 illustrates an exemplary diagram of a LAA frame structure with time shifting in accordance with embodiments of the current invention.

FIG. 3 illustrates a LAA frame structure with time shifting. Each subframe includes fourteen symbols. Each symbol is arranged in a specific symbol location. A symbol located in the leftmost column is referred to as symbol location zero, and a symbol located in the rightmost column is referred to as symbol location thirteen. The leftmost portion of FIG. 3 shows that the base station starts the transmission of a reservation signal towards the end of symbol location two (counting from zero on the left) in subframe n. Subframe n is a Type 1 subframe. A base station transmits all fourteen symbols of subframe n+1. Subframe n+1 is a Type 2 subframe. The base station transmits thirteen symbols in subframe n+2. Subframe n+2 is a Type 3 subframe. Note in subframe n, the RE patterns for data and reference signals starting from symbol 3 to symbol 13 are exactly the same as those for DwPTS in the TDD special subframe configuration 3; in other words they can be obtained by shifting the RE patterns of DwPTS in the TDD subframe configuration three by two symbols in the example. Of course, the time-shift amount depends on when the eNB grabs the channel. Note in subframe n, the resource element (RE) patterns for data and reference signals starting from symbol three to symbol thirteen are exactly the same as those for DwPTS (RS, Data and Control) in the Time-Division Duplex (TDD) special subframe configuration three. Said another way, they can be obtained by shifting the RE patterns of DwPTS in the TDD subframe configuration three by two symbols in the example. Of course, the time-shift amount depends on when the base station reserves the channel. In FIG. 3, and PBFCH is shown to share the same symbol(s) as PDCCH and PCFICH in subframes n, n+1 and n+2. PBFCH can also be located at symbols different from those for PDCCH/PCFICH, especially in the Type 1 subframes.

A UE monitoring the LAA carrier signal may have difficulty optimizing its Automatic Gain Control (AGC) settings for the incoming signal at symbol location three. At symbol location three, important such as CRS (Cell-specific Reference Signal) are received by the UE. Important control information or "channel information" such as PCFICH, PDCCH and PBFCH may be included in the symbol 3 location. Therefore, any issue in receiving the important control information and control information at that symbol location can be catastrophic. Accordingly, a solution to avoid failed communication of control information is required.

Figure 4:
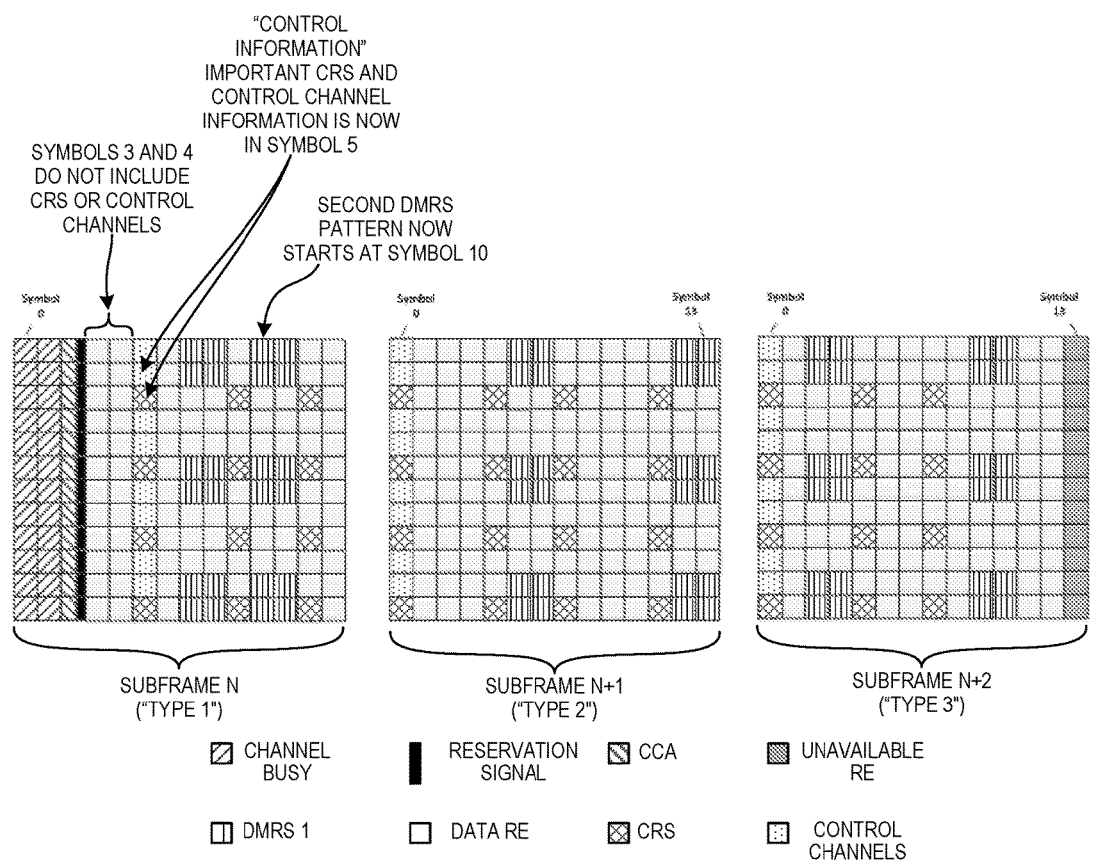
FIG. 4 illustrates an exemplary diagram of a LAA frame structure with Automatic Gain Control (AGC) protection in accordance with embodiments of the current invention.

FIG. 4 illustrates a LAA frame structure with AGC protection. As discussed above regarding FIG. 3, information communicated in the symbol location immediately following the reservation signal may be prone to failed communication due to the time required by the AGC circuit in the UE to properly adjust the receiver gain. In the LAA frame structure of FIG. 4, the control information including: a Cell-specific Reference Signal (CRS), a Physical Downlink Control Channel (PDCCH), a Physical Control Format Indicator Channel (PCFICH), or a Physical Broadcast Channel (PBCH), are moved to symbol location five. Moving the control information to symbol location five, opens up symbol locations three and four for regular data communications. The regular data communicated in symbol locations three and four may not be properly received; however, the bigger problem of not receiving the important control information is avoided by allowing additional time for the UE receiver AGC to properly adjust.

The two symbols are placed before the CRS residing symbol. The following ten symbols available for data channel mapping: 3,4,6,7,8,9,10,11 and 13. Data channel symbol mapping may follow the order of symbol indices: 6,7,8,9, 10,11,12,13,3,4 or 6,7,8,10,11,12,13,4,3 to avoid change in the redundancy version definition in HARQ.

As a consequence of the inserted symbol(s), the DMRS (Demodulation Reference Signal) patterns are modified in comparison with FIG. 3. In FIG. 4, the second occurrence of the DMRS patterns starts at symbol ten, which is adjacent to the CRS residing symbol at symbol nine. In FIG. 3, the second occurrence of the DMRS patterns starts at symbol twelve, which is spaced by four symbols to the CRS residing symbol at symbol seven.

Figure 5:
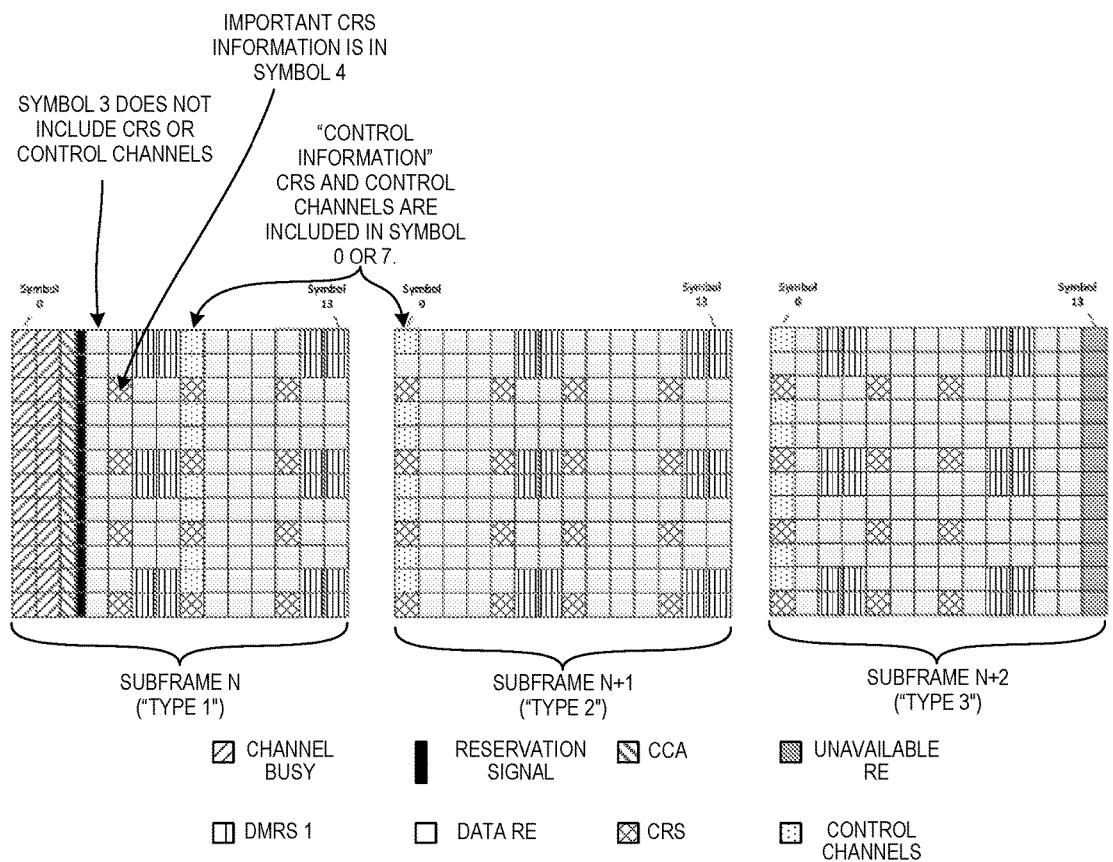
FIG. 5 illustrates an exemplary diagram of a truncated LAA frame structure with AGC protection in accordance with embodiments of the current invention.

FIG. 5 illustrates a truncated LAA frame structure with AGC protection. In fractional subframe n, PCFICH, PBFCH and PDCCH start from a fixed location in a subframe, preferably in the second slot (symbol locations seven to thirteen) in subframe n. In this case, a UE tries to detect a reference signal (e.g. CRS) at symbol location zero first, if it does not find CRS at symbol 0, then it will try to detect CRS at symbol location seven. In one example, the UE is preprogrammed to detect CRS at symbol locations zero and seven. In another example, the UE is programmed to detect CRS at symbol locations zero and seven in real-time across the wireless network.

It is noted that the rules to determine REs/REGs for PCFICH and PDCCH in the conventional LTE system can be reused for PCFICH and PDCCH and PBFCH starting from Slot 1 instead of Slot 0. The control information, including PCFICH, PBFCH and PDCCH is now protected from the AGC problem by moving the control information to a symbol location that does not immediately follow the symbol location used to communicate the reservation signal.

It is also noted that, in FIG. 5, the PBFCH, PCFICH and PDCCH are located at symbol location seven in subframe n. In general, it is desirable to reuse the design from LTE, which has undergone extensive scrutiny and revisions. The CRS based control channels are located in the first slot in a subframe, and given the second slot has the same CRS patterns as the first slot.

When type 1 subframes are supported, the base station needs to work under different hypotheses in terms of scheduling and assembling the type 1 burst, as there is uncertainty as to when the base station can reserve the channel. Therefore, it is beneficial to reduce the number of hypotheses the base station needs to work with. For type 1 bursts, changing the RE mapping order can help reduce the base stations burden. In the LTE downlink, the PDSCH mapping takes a frequency first order, and in the time domain, we have the following order of filling Res at symbols: [0123456789ABCD]. Now that we can start PDSCH from the second slot in a subframe, and when there are symbols available in the first slot the base station map PDSCH in this order: [DCBA9870123456]. In the case some symbols are unavailable for PDSCH (say 4 symbols (marked by "X"), then we have: [XXXX9870123456]. In this way, the base stations only needs to assembly a single Type 1 subframe assuming the order: [XCBA987 0123456]. In the event that the number of unavailable symbols is more than one, then some OFDM symbols are removed at the beginning.

Therefore, when a symbol is not available due to LBT or failed transmission of the reservation signal, the subframe is truncated. This way the base station only needs to assemble one fractional subframe and depending on the number of available symbols truncate the assembled fractional subframe for unavailable symbols. In contrast, without truncating, the base station may need to assemble fractional subframes under different hypotheses concerning the time when the base station reserves the channel.

Figure 6:
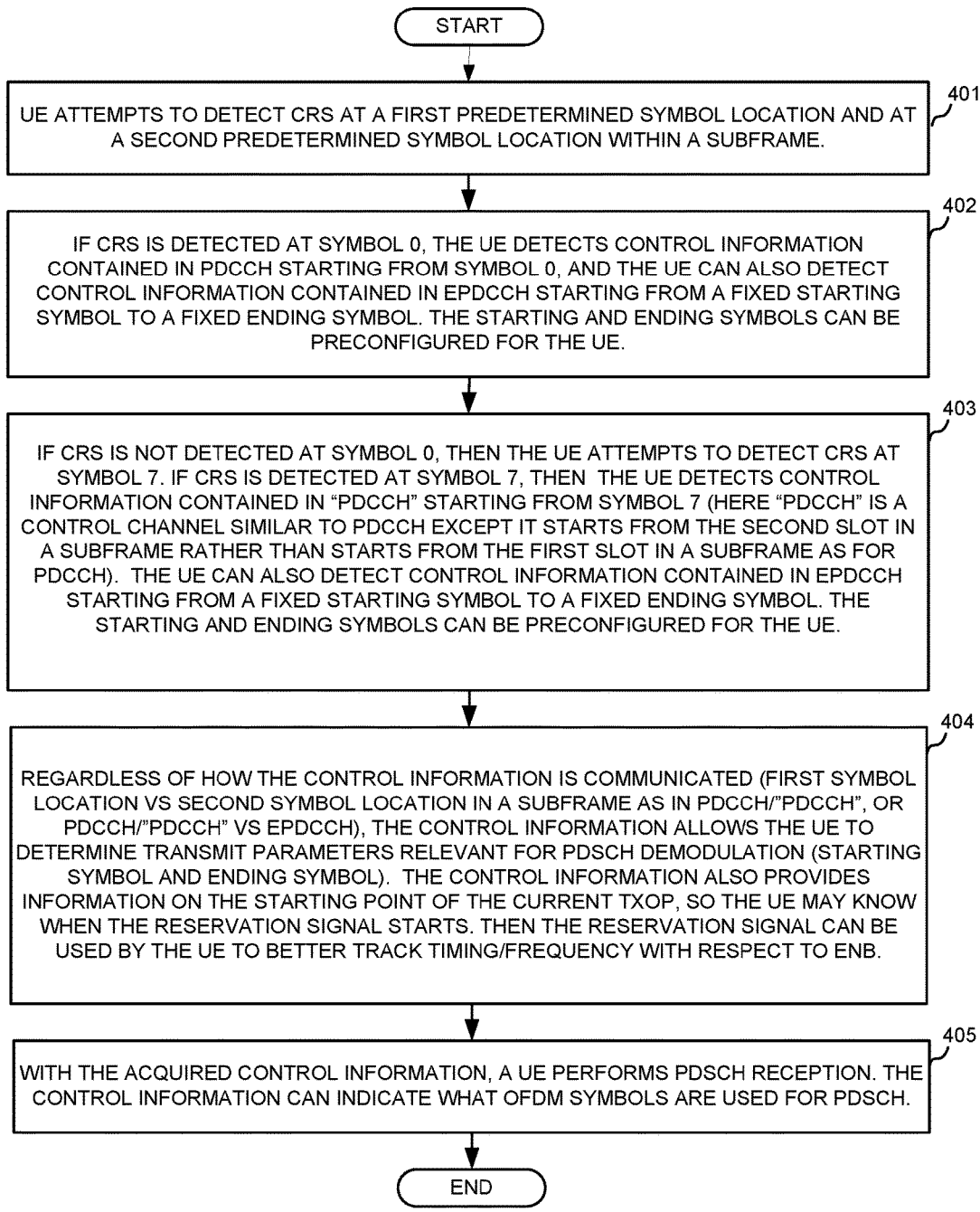
FIG. 6 is a flowchart for an UE detecting control information based on received symbol locations in accordance with embodiments of the current invention.

FIG. 6 is a flowchart describing the process of utilizing the control information communicated in two predetermined symbol locations. In step 401, a UE attempts to detect CRS at symbol location zero or symbol seven in a subframe. In step 402, if CRS at symbol zero is detected, the UE detects control information contained in PDCCH starting from symbol zero, and the UE can also detect control information contained in EPDCCH starting from a fixed starting symbol to a fixed ending symbol. The starting and ending symbols can be preconfigured for the UE. In step 403, if CRS at symbol zero is not detected, then the UE attempts to detect CRS at symbol seven. If CRS at symbol seven is detected, then the UE detects control information contained in "PDCCH" starting from symbol seven (here "PDCCH" is a control channel similar to PDCCH except it starts from the second slot in a subframe rather than starts from the first slot in a subframe as for PDCCH). In addition, the UE can also detect control information contained in EPDCCH starting from a fixed starting symbol to a fixed ending symbol. The starting and ending symbols can be preconfigured for the UE. In step 404, regardless of where and how the control information is communicated (first symbol location or second symbol location in a subframe as in PDCCH/"PDCCH", or PDCCH/"PDCCH" vs EPDCCH), the control information allows the UE to determine transmit parameters relevant for PDSCH demodulation (starting symbol and ending symbol). The control information also provides information on the starting point of the current TXOP, so the UE may know when the reservation signal starts. Then the reservation signal can be used by the UE to better track timing/frequency with respect to base station. It is clear in this example; the detection of reservation signal is an optimization rather than a necessary step in LAA reception. Detection of the reservation signal does not have to be the very first step a UE takes for LAA reception. In step 405, with the acquired control information, a UE performs PDSCH reception. The control information can indicate what OFDM symbols are used for PDSCH. Minimization of UE complexity for blind detection, can be achieved through minimizing the candidates for control information reception. From this process, when control information is communicated over PDCCH, there are only two locations in a subframe for a UE to check: i.e. either in the first symbol location or the second symbol location. However, PDSCH can start from a number of symbols much greater than two.

Figure 7:
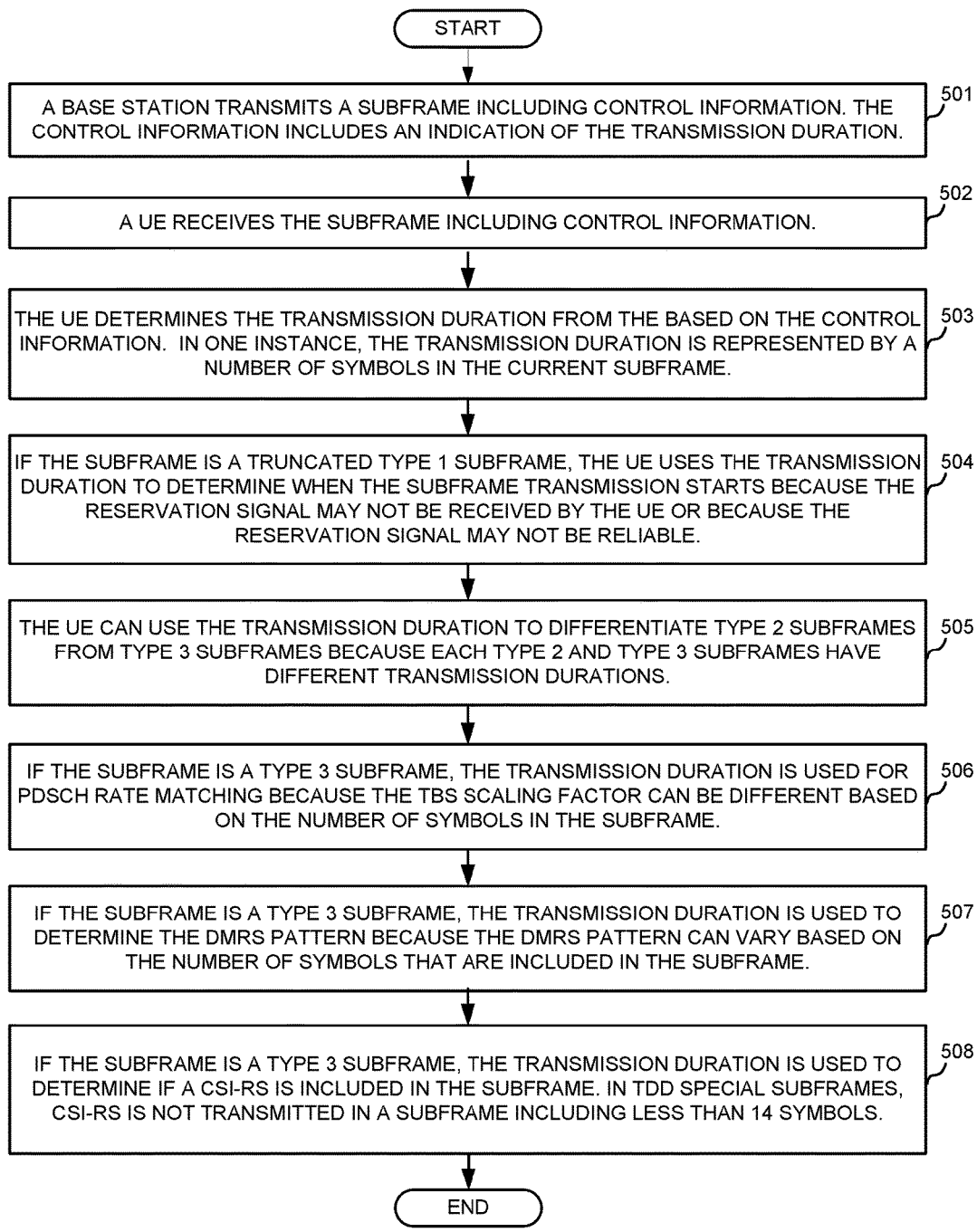
FIG. 7 is a flowchart describing the communication of transmission duration in an LAA subframe in accordance with embodiments of the current invention.

FIG. 7 is a flowchart describes the utility of an LAA subframe that includes transmission duration. In step 501, a base station transmits a subframe including control information. The control information includes an indication of the transmission duration. In step 502, a UE receives the subframe including control information. In step 503, The UE determines the transmission duration based on the control information. In one instance, the transmission duration is represented by a number of symbols in the current subframe. In step 504, if the subframe is a truncated type 1 subframe, the UE uses the transmission duration to determine when the subframe transmission starts because the reservation signal may not be received by the UE or because the reservation signal may not be reliable. In step 505, the UE can use the transmission duration to differentiate type 2 subframes from type 3 subframes because type 2 and type 3 subframes have different transmission durations. In step 506, if the subframe is a type 3 subframe, the transmission duration is used for PDSCH rate matching because the Transport Block Size (TBS) scaling factor can be different based on the number of symbols in the subframe. In step 507, if the subframe is a type 3 subframe, the transmission duration is used to determine the DMRS pattern because the DMRS pattern can vary based on the number of symbols that are included in the subframe. In step 508, if the subframe is a type 3 subframe, the transmission duration is used to determine if a CSI-RS is included in the subframe. In TDD special subframes, CSI-RS is not transmitted in a subframe including less than fourteen symbols.

Figure 8:
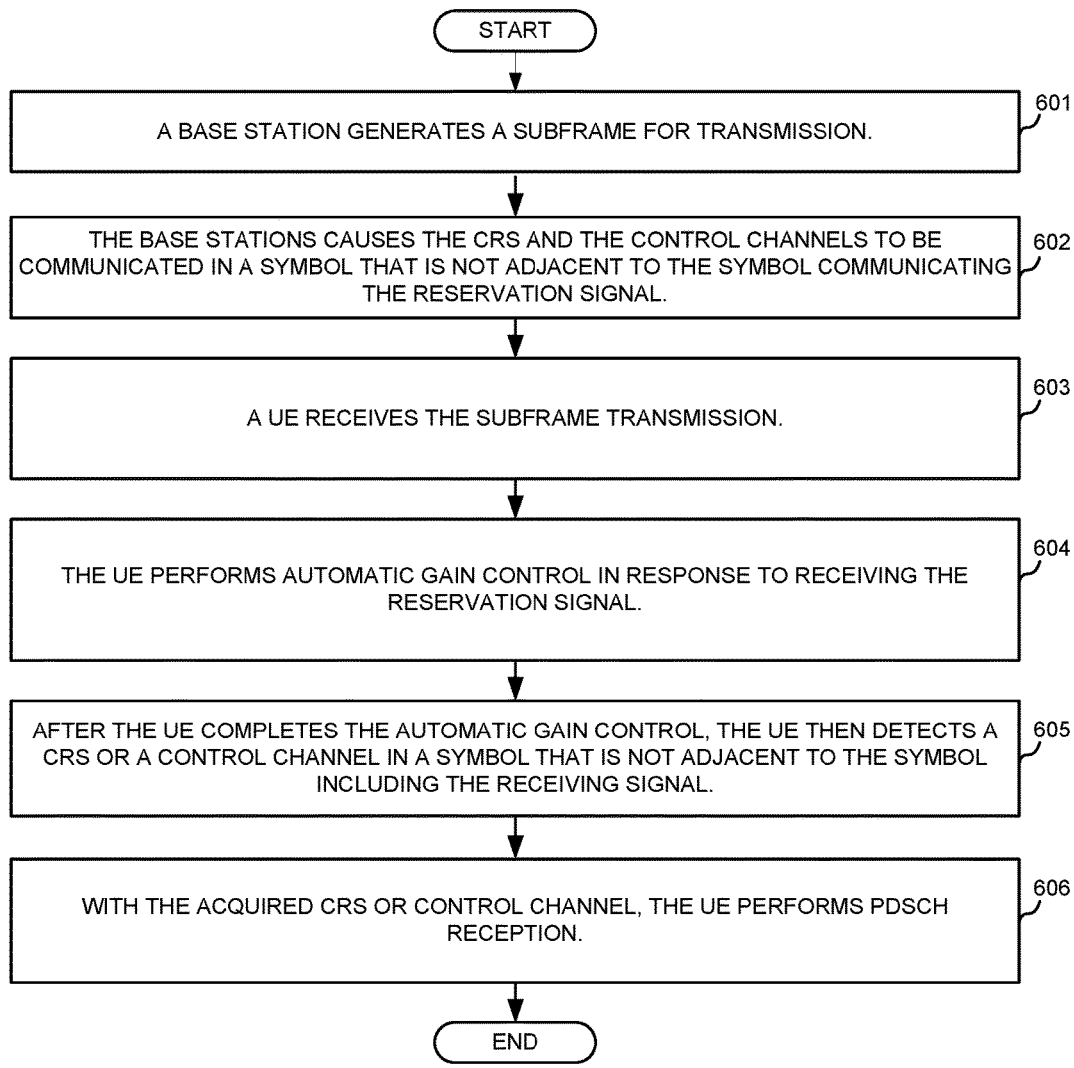
FIG. 8 is an exemplary flow chart describing Automatic Gain Control (AGC) protection in accordance with embodiments of the current invention.

FIG. 8 is a flowchart describing LAA subframe with AGC protection. In step 601, a base station generates a subframe for transmission. In step 602, the base station causes the CRS and the control channels to be communicated in a symbol that is not adjacent to the symbol communicating the reservation signal. In step 603, a UE receives the subframe transmission. In step 64, the UE performs automatic gain control in response to receiving the reservation signal. In step 605, after the UE completes the automatic gain control, the UE then detects a CRS or a control channel in a symbol that is not adjacent to the symbol including the receiving signal. In step 606, with the acquired CRS or control channel, the UE performs PDSCH reception.

Although the present invention has been described in connection with certain specific embodiments for instructional purposes, the present invention is not limited thereto. Accordingly, various modifications, adaptations, and combinations of various features of the described embodiments can be practiced without departing from the scope of the invention as set forth in the claims.

What is claimed is:

1. A method, comprising:
   (a) receiving an indication of a first symbol location and an indication of a second symbol location onto an User Equipment (UE);
   (b) receiving a License Assisted Access (LAA) subframe, wherein the LAA subframe includes multiple symbols;
   (c) determining if control information is present at the first symbol location within the received LAA subframe for any received LAA subframe;
   (d) determining if control information is present at the second symbol location within the received LAA subframe if it was determined in (c) that control information was not present at the first symbol location, wherein the first symbol location is different from the second symbol location; and
   (e) determining demodulation parameters based on the control information that is present in either the first symbol location or the second symbol location such that the LAA subframe is demodulated using the determined demodulation parameters.

2. The method of claim 1, wherein the LAA subframe is transmitted from a first base station to the UE via an unlicensed frequency band.

3. The method of claim 2, wherein the UE is also in communication with a second base station via a licensed frequency band.

4. The method of claim 1, wherein the LAA subframe is a truncated subframe.

5. The method of claim 1, wherein the first symbol location is symbol zero, and wherein the second symbol location is symbol seven.

6. The method of claim 1, wherein the control information includes at least one of: a Cell-specific Reference Signal (CRS), a Physical Downlink Control Channel (PDCCH), a Physical Control Format Indicator Channel (PCFICH), or a Physical Broadcast Channel (PBCH).

7. The method of claim 3, wherein the UE communicates with the first base station using Long-Term Evolution (LTE) wireless communication, and wherein the UE communicates with the second base station using LTE wireless communication.

8. A method, comprising:
   (a) receiving a License Assisted Access (LAA) subframe onto a User Equipment (UE), wherein the LAA subframe includes multiple symbols;
   (b) determining a transmission duration based on the received subframe; and
   (c) determining a type of subframe, wherein the determining is a function of the received LAA subframe and the transmission duration, wherein the LAA subframe was received via an unlicensed frequency band, and wherein steps (a) through (c) are performed by the UE.

9. The method of claim 8, wherein control information is included in the LAA subframe, and wherein the transmission duration is included in the channel information.

10. The method of claim 9, wherein the transmission duration is a total number of symbols in the received LAA subframe.

11. The method of claim 9, wherein the transmission duration is a number of remaining symbols in the received LAA subframe.

12. The method of claim 8, wherein the UE receives the LAA subframe from a first base station via an unlicensed frequency band, and wherein the UE is also in communication with a second base station via a licensed frequency band.

13. The method of claim 8, further comprising:
(d) determining the beginning of the LAA subframe when a reservation signal was not received.

14. The method of claim 8, further comprising:
(d) performing Physical Downlink Shared Channel (PDSCH) rate matching using the transmission duration.

15. The method of claim 8, further comprising:
(d) determining the Demodulation Reference Signal (DMRS) pattern using the transmission duration.

16. The method of claim 8, further comprising:
(d) determining if Channel State Information Reference Signal (CSI-RS) is transmitted in the LAA subframe, wherein the LAA subframe is a Time-Division Duplex (TDD) subframe.

17. A user equipment (UE), comprising:
a transceiver that transmits and receives radio signals;
a memory; and
a processor coupled to the memory, the processor configured to receive an indication of a first symbol location and an indication of a second symbol location, to receive a License Assisted Access (LAA) subframe, wherein the LAA subframe includes multiple symbols, to determine if control information is present at the first symbol location within the received LAA subframe for any received LAA subframe, to determine if control information is present at the second symbol location within the received LAA subframe if it was determined that control information was not present at the first symbol location, wherein the first symbol location is different from the second symbol location, and to determine demodulation parameters based on the control information that is present in either the first symbol location or the second symbol location such that the LAA subframe is demodulated using the determined demodulation parameters.

18. The UE of claim 17, wherein the LAA subframe is transmitted from a first base station to the UE via an unlicensed frequency band.

19. The UE of claim 18, wherein the UE is also in communication with a second base station via a licensed frequency band.

20. The UE of claim 17, wherein the LAA subframe is a truncated subframe.

* * * * *